United States Patent [19]
Lovdahl

[11] 3,864,992
[45] Feb. 11, 1975

[54] LIMITED SLIP DIFFERENTIAL HAVING SHAFT LOCKING AND CLUTCH ACTUATING MEANS

[75] Inventor: Richard H. Lovdahl, Dearborn Heights, Mich.

[73] Assignee: General Motors Corporation, Detroit, Mich.

[22] Filed: May 31, 1973

[21] Appl. No.: 365,545

[52] U.S. Cl............... 74/711, 74/710.5, 74/713
[51] Int. Cl........................ F16h 1/44, F16h 1/40
[58] Field of Search ......... 74/710, 710.5, 711, 713; 85/7, 8.6, 8.9; 403/345, 376

[56] References Cited
UNITED STATES PATENTS

| | | | |
|---|---|---|---|
| 1,203,085 | 10/1916 | Wallace | 74/710.5 |
| 3,186,258 | 6/1965 | Meldola | 74/710.5 |
| 3,400,611 | 9/1968 | Engle | 74/710.5 |
| 3,429,400 | 2/1969 | Engle et al. | 74/710.5 X |
| 3,533,488 | 10/1970 | Engle | 74/710.5 X |
| 3,624,717 | 11/1971 | Brubaker | 74/711 |

Primary Examiner—Samuel Scott
Assistant Examiner—P. S. Lall
Attorney, Agent, or Firm—Paul Fitzpatrick

[57] ABSTRACT

A limited slip differential contains a pair of members biased outward from each other by springs against the side gears to preload the clutches. The members have aligned keyhole-like openings for the insertion and retention of the inner ends of axial shafts having circumferential grooves thereon and also have interlocking arms that cause them to move as a unit between shaft insertion and shaft locking positions but allow spring biased movement away from each other. One of the members has a tab projecting through an opening in the case for movement of the members to lock or release the axle shaft, the tab being lockable outside the case in the shaft locking position.

2 Claims, 3 Drawing Figures

LIMITED SLIP DIFFERENTIAL HAVING SHAFT LOCKING AND CLUTCH ACTUATING MEANS

BACKGROUND OF THE INVENTION

One means of retaining the inner end of a vehicle axle shaft within a differential drive mechanism is to provide the inner end of the axle shaft with a circumferential groove in which is inserted a retaining device such as "C" washer as shown in U.S. Pat. No. 3,400,611, issued to J. F. Engle on Sept. 10, 1968. In differentials of the limited slip type, which generally contain a pair of members between the side gears biased apart by spring means to preload the limited slip clutches, the C washer can be eliminated by having the spring biased members double as axle shaft retaining devices. Examples of such apparatus are shown in U.S. Pat. No. 3,624,717, issued Nov. 30, 1971 to Richard K. Brubaker, who discloses spring retention and clutch loading members having aligned keyhole-shaped openings therethrough, the members being movable for selective retention or release of the axle shaft. However, the apparatus of Brubaker, as well as that of Engle and other prior art, requires partial disassembly of the differential before the axle shaft can be released. This often results in extra work and difficulty in the servicing of differentials and rear axles, especially when small parts must be removed from cramped and confined locations.

SUMMARY OF THE INVENTION

This invention relates to a differential having a pair of shaft locking and clutch biasing members which can easily be moved between shaft retention and shaft releasing positions from outside the rotatable differential case. The members have keyhole-like openings for selective retention or release of the axle shaft, interlocking arms which force the members to move as a unit between the shaft retention and shaft release positions but allow independent movement in the clutch biasing direction, and a tab projecting from one of the members through an opening in the rotatable case. The tab allows movement of the members from outside the case and can be locked to the case with the members in the shaft retaining position. Further details and advantages of this invention will be apparent to those skilled in the art from the following description and diagram.

DESCRIPTION OF THE PREFERRED EMBODIMENT

Figure 1:
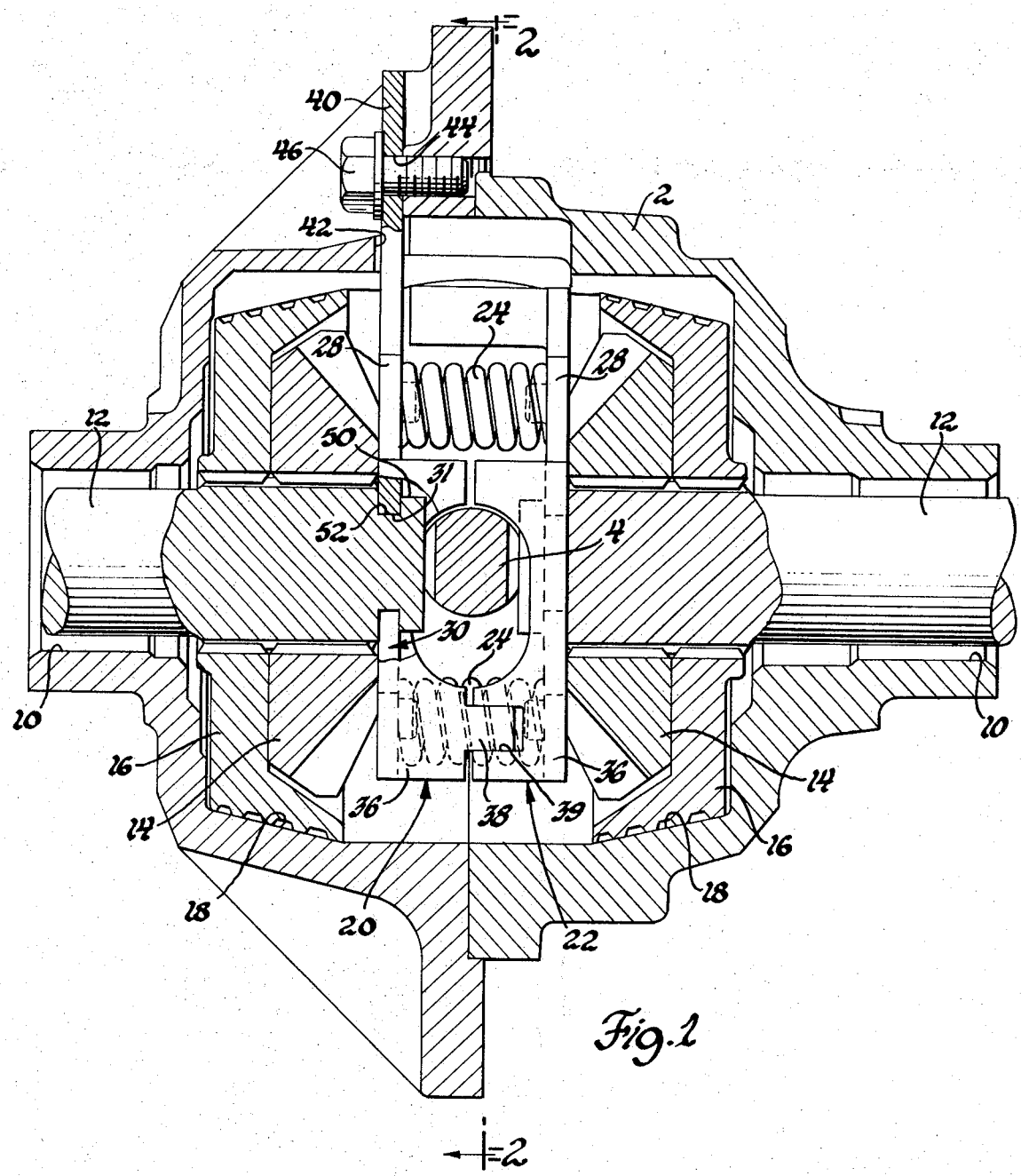
FIG. 1 is a cutaway view of a limited slip differential according to this invention.
Figure 2:
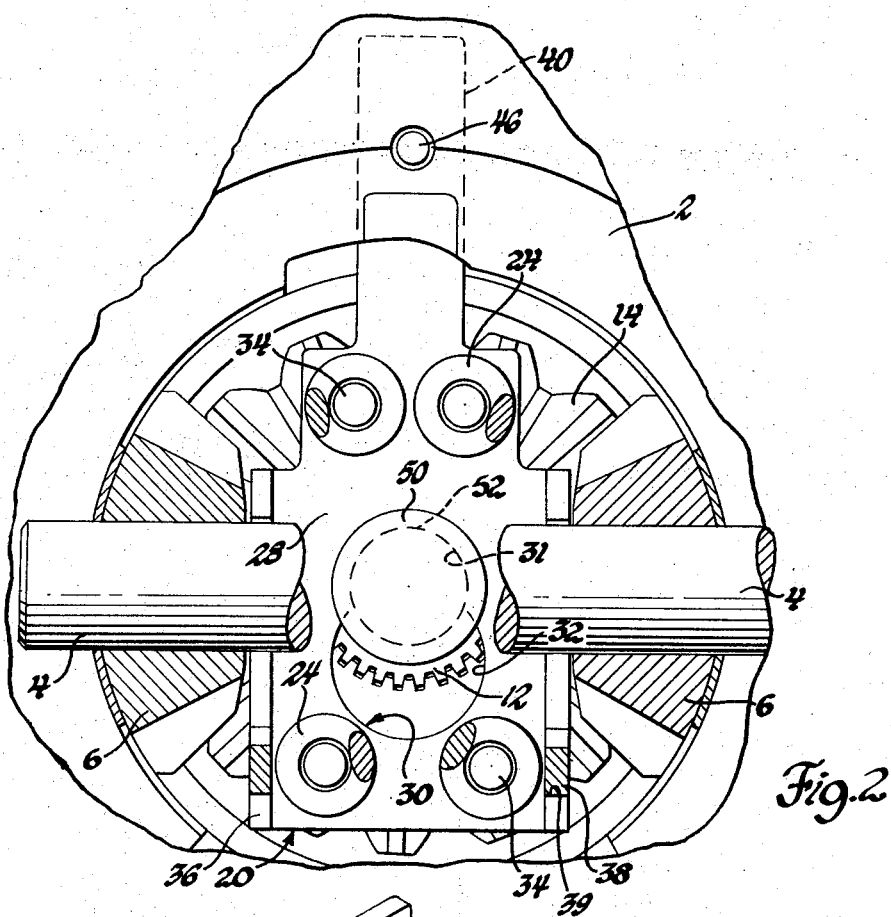
FIG. 2 is a sectional view along line 2—2 in FIG. 1.

Referring to FIGS. 1 and 2, a differential has a case 2 which is rotatably drivable about a horizontal axis. A pinion shaft 4, fixed in the housing 2, carries pinion gears 6 near both ends thereof. The case 2 has a pair of openings 10 on opposite sides thereof, through which project axle shafts 12. On each of the axle shafts 12 is splined a side gear 14 so that the side gear 14 must rotate with the axle shaft 12 but is free to move axially relative thereto. Each of the side gears 14 engages each of the pinion gears 6 in a conventional differential gear arrangement. Each of the axle shafts 12 also carries splined thereon a clutch means, shown in this embodiment as conical clutch member 16, between the side gear 14 and the case 2. The case 2 has, adjacent each clutch member 16, a correspondingly conical inner surface 18 for engagement therewith when the clutch member 16 is biased by the side gear 14 against the case 2.

Means to establish a preload bias between the clutch members 16 and case 2 comprise a pair of members 20 and 22 straddling the pinion shaft 4 between the side gears 14 and retaining therebetween a plurality of compressed springs 24. The springs 24 bias each of the members 20 and 22 against its adjacent side gear 14, each of the side gears 14 against its adjacent clutch member 16, and each of the clutch members 16 against the surface 18 of the case 2 in a manner well known in the differential drive art.

Figure 3:
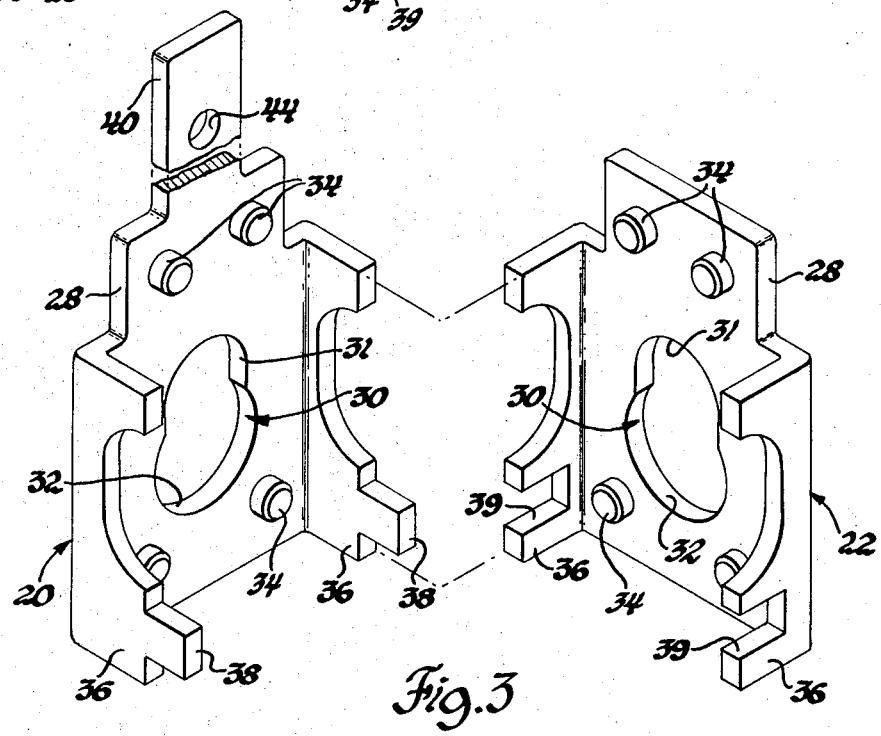
FIG. 3 is a perspective view of the shaft retaining and clutch biasing members shown in FIGS. 1 and 2.

The members 20 and 22 are shown in FIG. 3. Each comprises a base plate portion 28 having a keyhole-like opening 30 therethrough, which keyhole-like opening 30 consists of a circular opening 31 above intersected at its widest point by a circuit 32 of somewhat larger diameter below. The opening 30 is surrounded by a plurality of raised spring seats 34. Each of the members has extending from its base plate toward the other a pair of arms 36 which include tabs 38 on member 20 and slots 39 on member 22. The tabs 38 interlock with the slots 39 so that the members 20 and 22 must move together in the up and down direction as shown in the Figures but can move freely toward or from each other. A portion of the base plate 28 of member 20 extends upward to form another long tab 40, the purpose of which will be described at a later point.

Referring again to FIG. 1, the inner ends 50 of the axle shaft 12 are somewhat reduced in diameter from that of the remainder of the shaft. Near the inner end 50 the diameter of the shaft 12 is even further reduced to form a circumferential groove 52. The relationship of the diameters of the shaft 12, the inner end 50 and the circumferential groove 52 is such that the inner end 50 can be inserted through the larger diameter portion 32 of the keyhole-like opening 30 but the main body of the axle shaft 12 cannot. When the axle shaft 12 is inserted through the opening 30 as far as it will go, the member 20 or 22 can be moved downward to bring the smaller diameter portion 31 of the opening 30 adjacent the circumferential groove 52. The smaller diameter portion 31 of the opening 30 is smaller in diameter than the inner end 50 of the axle shaft 12; and therefore the axle shaft 12 is axially locked, as shown in FIG. 2.

The tab 40 of member 20 projects upward, as shown in FIG. 1, through an opening 42 in the case 2. The tab 40 has a hole 44, through which a bolt 46 is inserted to lock the member 40 to the case 2 in the position shown in the Figures. Because of the tabs 38 inserted in the slot 39, member 22 is also locked into this position. This is the shaft locking position of the members 20 and 22, in which the axle shafts 12 are retained with their circumferential groove 52 adjacent the smaller diameter portion 31 of the keyhole-like opening 30.

When it is desired to remove an axle shaft from the differential unit, the removal of bolt 46 allows members 20 and 22 to be pulled upward by the tab 40. When members 20 and 22 have moved upward to the point where the inner ends 50 of the axle shafts 12 are aligned with the larger diameter portions 32 of the keyhole-like openings 30, the axle shafts 12 can be pulled directly out of the differential unit. Reinsertion and locking of the axle shaft within the differential unit is accomplished by a reversal of these steps.

The apparatus described is only the preferred embodiment of my invention; and alternative equivalent embodiments will undoubtedly occur to those skilled in the art. Therefore my invention should be limited only by the claims, which follow.

I claim:

1. A differential drive mechanism comprising, in combination:

a rotatable housing having a plurality of openings therethrough;

a pair of oppositely extending rotatable shafts extending through a pair of said openings, each of said shafts having an inner end within said housing with a circumferential groove near said inner end;

a side gear axially movable on each of said shafts within said housing outward of said groove;

clutch means between each of said side gears and said housing actuable by outward movement of said side gears;

shaft locking and clutch actuating means comprising a pair of members between said side gears and spring means between said members biasing said members and side gears outward to actuate said clutch means, said members having aligned keyhole-like openings therethrough, said keyhole-like openings having larger portions adapted for insertion of said inner shaft ends therethrough with said members in a first position and smaller portions adapted for engagement of said circumferential grooves for retention of said shaft ends with said members in a second position, said members having mutually engaging arms with interlocking means to cause said members to move together between said first and second positions but allow biasing of said members away from one another by said spring means, one of said members having tab means projecting through another of said openings in said housing whereby said members can be moved between said first and second position; and means to lock said tab means on the outside of said housing to hold said members in said second position.

2. An axle shaft retention and clutch actuating device adapted for use in a limited slip differential drive mechanism having a rotatable housing with a plurality of openings therethrough, a pair of oppositely extending rotatable axle shafts extending through a pair of said openings, an axially movable side gear carried on each of said axle shafts within said rotatable housing for rotation with said axle shafts and clutch means between each of said side gears and said housing actuable by outward movement of said side gears, each of said axle shafts having a circumferential groove thereon between said side gears, said axle shaft retention and clutch actuation device comprising, in combination:

a pair of members for placement between said side gears and spring means between said members biasing said members and side gears outward to actuate said clutch means, said members having aligned keyhole-like openings therethrough, said keyhole-like openings having larger portions adapted for insertion of said axle shafts therethrough with said members in a first position and smaller portions adapted for engagement of said circumferential grooves for retention of said axle shafts with said members in a second position, said members having arms projecting toward each other, said arms having interlocking means comprising at least one slot in an arm of one member and at least one tab in an arm of the other member, said tab adapted for insertion in said slot to cause said members to move together between said first and second positions but allow outward biasing of said members by said spring means, one of said members having another tab projecting through another of said openings in said housing whereby said members can be moved between said first and second position, said axle shaft retention and clutch actuating device further comprising means outside said housing for locking said tab to said housing with said members in said second position.

* * * * *